(12) United States Patent
Park

(10) Patent No.: US 10,376,808 B2
(45) Date of Patent: Aug. 13, 2019

(54) SEA WATER EVAPORATOR, AND EVAPORATION ROPE MODULE FOR SALT PRODUCTION

(71) Applicant: Yong Hee Park, Incheon (KR)

(72) Inventor: Yong Hee Park, Incheon (KR)

(73) Assignees: Joong Il Choi, Incheon (KR); Yong Hee Park, Incheon (KR)

( * ) Notice: Subject to any disclaimer, the term of this patent is extended or adjusted under 35 U.S.C. 154(b) by 931 days.

(21) Appl. No.: 14/775,857

(22) PCT Filed: Dec. 6, 2013

(86) PCT No.: PCT/KR2013/011302
§ 371 (c)(1),
(2) Date: Dec. 11, 2015

(87) PCT Pub. No.: WO2014/148722
PCT Pub. Date: Sep. 25, 2014

(65) Prior Publication Data
US 2016/0114258 A1    Apr. 28, 2016

(30) Foreign Application Priority Data

Mar. 21, 2013  (KR) .................. 10-2013-0030368

(51) Int. Cl.
| | |
|---|---|
| *B01D 1/00* | (2006.01) |
| *B01D 1/16* | (2006.01) |
| *C01D 3/06* | (2006.01) |
| *C02F 1/14* | (2006.01) |
| *B01D 1/24* | (2006.01) |
| *B01D 1/30* | (2006.01) |

(Continued)

(52) U.S. Cl.
CPC ............. *B01D 1/0035* (2013.01); *B01D 1/16* (2013.01); *B01D 1/18* (2013.01); *B01D 1/24* (2013.01); *B01D 1/30* (2013.01); *C01D 3/06* (2013.01); *C02F 1/14* (2013.01); *C02F 2103/08* (2013.01); *Y02A 20/128* (2018.01); *Y02A 20/141* (2018.01); *Y02A 20/212* (2018.01)

(58) Field of Classification Search
CPC ...... B01D 1/00; B01D 1/0064; B01D 1/0035; B01D 1/16; B01D 1/18; B01D 1/24; B01D 1/30; C02F 1/14; C02F 2103/08
See application file for complete search history.

(56) References Cited

FOREIGN PATENT DOCUMENTS

| KR | 2020080006451 | 12/2008 |
|---|---|---|
| KR | 2020100005160 | 5/2010 |

(Continued)

OTHER PUBLICATIONS

International Search Report—PCT/KR2013/011302 dated Mar. 27, 2014.

*Primary Examiner* — Renee Robinson
*Assistant Examiner* — Derek N Mueller
(74) *Attorney, Agent, or Firm* — Cantor Colburn LLP

(57) ABSTRACT

High efficiency seawater evaporation apparatus comprises showering unit installed at the saltpan; and evaporation rope module wherein multiple evaporation ropes are collected in group by the holder and the respective evaporation modules are extended along the upper and lower direction in the state each other separated in a predetermined interval and wherein, when the seawater is supplied to the respective evaporation ropes by the showering unit, the seawater may flow down along the surface of the respective evaporation ropes and the evaporation of the seawater may be accelerated.

15 Claims, 16 Drawing Sheets

(51) Int. Cl.
*B01D 1/18* (2006.01)
*C02F 103/08* (2006.01)

(56) References Cited

FOREIGN PATENT DOCUMENTS

| KR | 200454519 | 7/2011 |
| KR | 101085446 | 11/2011 |
| KR | 101530069 | 6/2015 |
| KR | 20150090562 | 8/2015 |

SEA WATER EVAPORATOR, AND EVAPORATION ROPE MODULE FOR SALT PRODUCTION

BACKGROUND OF INVENTION

Generally, the method that the seawater is pulled up to the saltpan and is dried (evaporated) by the sun is adopted as the salt manufacturing method. In other words, after the seawater is drawn up in the square saltpan where the liner of the tile or the plastic liner or the ceramic material is attached on the bottom surface and if the seawater is evaporated in the natural state with the solar energy, the salt may be precipitated in the crystallization section of the saltpan, and the worker may produce the salt by collecting the natural salt that the seawater has been evaporated out. Like this, the natural salt made by evaporation of the seawater contains calcium, magnesium and very kinds of minerals. This natural salt is well known to be useful to the health of human.

There is saltpan salt collection apparatus (Korean Patent No. 10-1530069, Inventor: YOO, Myoung Hwa) as the prior art. And, there is the automation device for the saltpan salt picking (Korean Patent Application No. 10-2014-0011362, Inventor: CHUNG Dong Teak and so on) as another prior art.

However, in case of the method that the seawater is drawn to the saltpan to be evaporated and the salt is produced, multiple square saltpans are consecutively provided, the salt may be extracted through the course that the seawater is evaporated while the drawn seawater is going over from one saltpan to another neighboring saltpan. In case of the salt manufacturing method like the above, because the saltpan section of relatively large area has to be secured in consideration of the evaporation rate of seawater and so on, it is difficult to install the saltpan in the area where the saltpan lot is limited. And, the security of the saltpan lot becomes more and more difficult due to the development project of the coast. And, owing to the limitation of the saltpan lot and so on, the saltpan cannot be rapidly increased even if the demand of the salt is increased, and the saltpan cannot be rapidly decreased even if the demand of the salt is decreased. Therefore, there is the problem that the administration of the salt productivity is inefficient and the salt productivity (the productivity per time) is degraded due to the delay of the evaporation rate of seawater.

In the meantime, there is a seawater evaporation device wherein a plurality of the evaporation sheets (for example, diaper sheets) are hung over the laundry rope, the evaporation surface area is broadened, the seawater evaporation rate is enhanced, the hoist is set up in the upper portion, the evaporation sheet block is ascended and descended by the hoist, and the salt concentration of the seawater may become higher in the reservoir of the lower part.

However, in case of the seawater evaporation apparatus as described above, there are the disadvantages that, if the wind blows hard, the resistance grows serious windily and the problem occurs in the equipment maintenance (in other words, the maintenance of the evaporation sheet etc). And, the problem as described above does not occur in case the seawater evaporation apparatus is the miniature but, if the seawater evaporation apparatus is the large size device, the problems may occur that the evaporation sheet tumbles down owing to the typhoon or the hard wind etc and the seawater evaporation apparatus of the prior art may not be employed to the large size device. Therefore, the other seawater evaporation apparatus is developed recently. The other seawater evaporation apparatus may evaporate the seawater using the evaporation rope and may prepare for the strong wind and so on by descending the evaporation rope if the strong wind such as the typhoon etc.

In the meantime, if the seawater is to the utmost exposed to the sun, the air and so on, and the seawater moves at the same time, the moisture evaporation efficiency becomes maximized and the time of the seawater evaporation may be minimized to the utmost. Because the seawater is made to flow down from the upper position in order to sprinkle the seawater on the evaporation rope and smoothly evaporate the moisture, the means for making the seawater flow down from the upper position and making the moisture evaporation efficiency maximized is required in the present.

SUMMARY OF THE INVENTION

The invention has been made to solve the foregoing problems with the prior art, and therefore the purpose of the invention is to provide high efficiency seawater evaporation apparatus and evaporation rope module wherein the evaporation rate of seawater may be accelerated to decrease the facility site of the saltpan for the salt precipitation and the effectiveness as well as the economical efficiency of the salt production may be maximized. Particularly, the purpose of the invention is to provide the high efficiency seawater evaporation apparatus and the evaporation rope module wherein the evaporation rope module may be installed without the structure exchanging of the saltpan and the seawater may be evenly sprinkled on the evaporation rope. The invention is provided with the specific structure that the moisture may be evaporated rapidly while the seawater is flowing from the upper position to the lower position by gravity, at the same time, the evaporation area of the seawater may be maximized. The invention may contribute for making the seawater with high salt concentration collected in the lower saltpan (the evaporating pond) and for making the evaporation rate of the seawater accelerated remarkably.

The invention is provided with the specific structure wherein all the showered seawater is being streamed down along the evaporation rope from the upper position to be evaporated and the seawater is not jammed at the horizontal direction. Therefore, the salt concentration time may be shortened to the utmost. The invention has a great meaning in the point that it may provide high efficiency seawater evaporation apparatus and evaporation rope module of the new structure which may be remarkably helpful for segregating the sea salt rapidly to the utmost and may maximize the productivity of the sea salt.

BRIEF DESCRIPTION OF THE DRAWINGS

The above and other aspects, features and advantages of certain exemplary embodiments of the invention will be more apparent from the following description taken in conjunction with the accompanying drawings, in which.

DETAILED DESCRIPTION OF THE INVENTION

Figure 1:
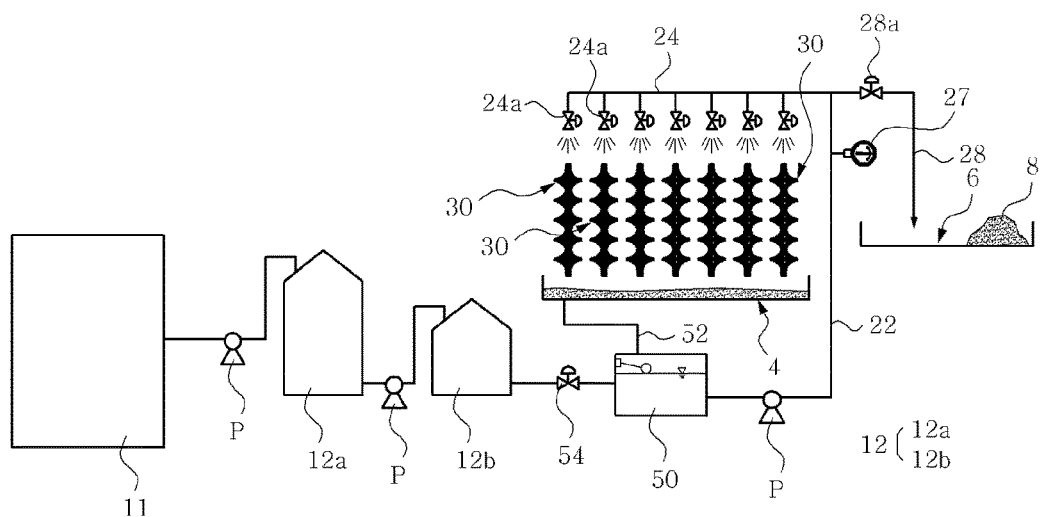
FIG. 1 is a drawing which schematically shows the configuration of the high efficiency seawater evaporation apparatus according to the invention.

The invention will now be described more fully hereinafter with reference to the accompanying drawings, in which exemplary embodiments thereof are shown.

Referring to the drawings, according to the embodiment of the auto cleansing apparatus of the invention, the high efficiency seawater evaporation apparatus of the invention includes the showering unit installed in the saltpan 4 and the evaporation module wherein multiple evaporation ropes 34 are configured to be collected in group with the holder 32 and are configured to be extended along the upper and lower direction in the state where the evaporation ropes 34 are each other separated in a predetermined interval. If the seawater is supplied to the respective evaporation ropes 34 through the showering unit, the seawater flows down along each evaporation rope 34 which is extended along the upper and lower direction and is separated so that the gap be secured. Therefore, the evaporation of the seawater may be accelerated remarkably. According to the invention, when the seawater is sprinkled to the evaporation rope 34, the seawater is not jammed at the horizontal direction but all the seawater flows down along the upper and lower direction of the evaporation rope 34 so that the moisture of the seawater is steamed away. Accordingly, the invention has the profitable advantage that the enriched water of the appropriate salt concentration is to the utmost rapidly made and the precipitation speed of the salt (especially, the precipitation speed of the sea salt) may be maximized and the salt precipitation is possible even in the area whose square is not wide because the sufficient amount of the salt may be precipitated even in the relatively small site.

The showering unit comprises a plurality of the dispersion pipes 24 provided in the saltpan 4. The dispersion pipes 24 are connected to the seawater pumping pipe 22 in which the seawater may be raise by the pump P. The dispersion pipes 24 are arranged to the horizontal direction (the direction which is opposite direction to the bottom surface of the saltpan 4) and the respective dispersion pipes 24 are parallel each other. Four seawater pumping pipes 22 are installed in at least four places of the saltpan 4 (that is, the corner parts of the rectangular saltpan 4) along the vertical direction, the edge dispersion pipes 24 of are installed at the edge part of the saltpan 24 along the horizontal direction and multiple cross dispersion pipes 24 are aligned to be connected to multiple dispersion pipes 24 in the horizontal direction. The cross dispersion pipes 24 and the edge dispersion pipes cross each other. In this way, the structure may be acquired that multiple dispersion pipes 24 which are parallel each other may be set up at the upper position of the saltpan 4.

Figure 2:
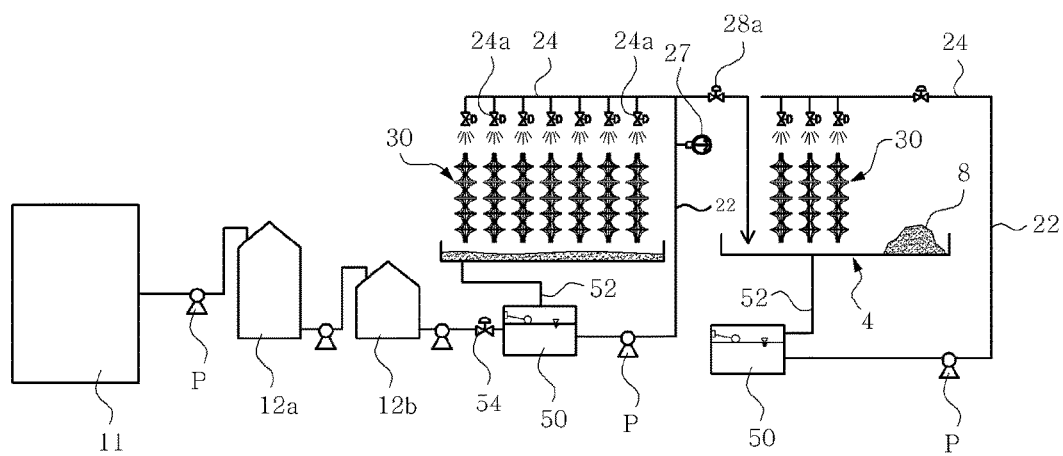
FIG. 2 is a drawing which schematically shows the configuration of the other embodiment of the high efficiency seawater evaporation apparatus according to the invention.
Figure 3:
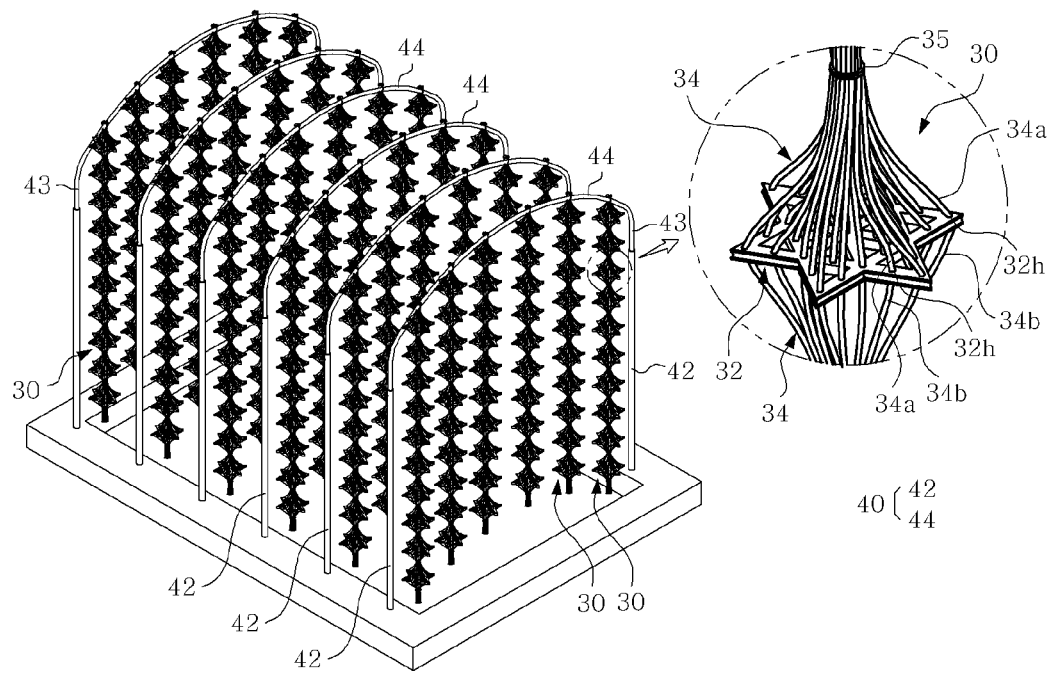
FIG. 3 is a perspective view showing the configuration and installation state of the evaporation rope module which is the main part of the invention.

Moreover, the horizontal seawater dispersion pipe 24 is connected to the seawater pumping pipe 22. The seawater pumping pipe 22 is set up at each corner position of the saltpan 4 along the vertical direction and the horizontal seawater dispersion pipe 24 is arranged as the closed-loop shape along the circumference of the saltpan 4. The pump P called the seawater pumping power source is connected to the horizontal seawater dispersion pipe 22. Said pump P becomes the pump connected between the overflow water tank 50 to be described below and the seawater pumping pipe 22. In this case, if the pump P is operated, the seawater is pumped to rise in the inner portion of the seawater pumping pipe 22 along the vertical direction and the seawater is distributed to each dispersion pipe 24. And the seawater pumped to each dispersion pipe 24 passes through the valve and the nozzle pipe 24 equipped in the dispersion pipe 24 and is sprinkled to the respective evaporation rope modules 30. The evaporation rope module 30 will be described below. At this time, the invention may have the following structure. So the speak, the dispersion pipe 24 is set up in the upper position of the saltpan 4 along the horizontal direction, the pump P is directly connected to each dispersion pipe 24 through the connection means such as the connection pipe in order that the seawater may be directly supplied to the dispersion pipe 24 arranged along the horizontal direction by the pump P, and the seawater may be sprinkled through the nozzle pipe 25 equipped in the dispersion pipe 24. Moreover, multiple dispersion pipes 24 may be set on the vertical direction, multiple nozzle pipes 25 may be set up in the respective vertical dispersion pipes 24, and the pump P is connected in the vertical direction dispersion pipe 24. In this case, the seawater may upwardly come up with the pump P along the inner portion of the vertical direction dispersion pipe 24 and may be sprinkled to the evaporation rope module 30 through the respective nozzle pipes 25. At this time, preferably the dispersion pipe 24 is provided with valve 24a. FIGS. 1 and 2 show that the valve 24a is divided from the dispersion pipe 24. The respective valve 24a is installed at the nozzle pipe 25 or one valve 24a is commonly connected to multiple nozzle pipes 25. The seawater is distributed to each nozzle pipe 25 through the valve 24a to be sprinkled (scattered).

In the meantime, the invention preferably has the structure that the horizontal direction dispersion pipe 24 is inclined to both sides based on the center. That is, it is preferable that the horizontal direction dispersion pipe 24 has the structure so that the center be the highest and both end parts be gradually decreased. The structure is also possible that one end of the horizontal direction dispersion pipe 24 is relatively high and another end of the horizontal direction dispersion pipe 24 is arranged in the inclined state. That is, one end of the horizontal direction dispersion pipe 24 is higher than another end of the horizontal direction dispersion pipe 24. The horizontal direction dispersion pipe 24 has the structure of being interconnected by the connection support bar which is placed toward the orthogonal direction in order to maintain the support stiffness. That is, the structure may be possible that the horizontal direction dispersion pipe 24 and the connection support bar may be connected each other as the grid type.

In the meantime, the showering unit may include the hose of the flexible material, the hole (micro hole) of the hose and the seawater pumping equipment. The hose may be bound to the upper end of the evaporation rope 20 using the fixing means such as the strap. The hole is formed at the hose of the flexible material. The seawater pumping equipment such as the pump is connected to the flexible hose. In this case, the seawater may be sprinkled through the hole of the hose.

The evaporation rope module 30 has the structure that multiple evaporation ropes 34 are configured to be collected in group with the holder 32 and the respective evaporation ropes 34 are extended along the upper and lower direction in the state the respective evaporation ropes 34 are each other separated in a predetermined interval. In case of the evaporation rope module 30, there is no evaporation rope 34 which is arranged along the horizontal direction and all the evaporation ropes 34 are disposed to face the upper and lower direction. While the seawater moves along the upper and lower direction with gravity, the moisture of the seawater may be evaporated so that the enriched water (the seawater in which the salt content is increased) may be rapidly produced. It is important that the seawater in which the salt content is increased may be rapidly made by the evaporation rope module 30.

Figure 4:
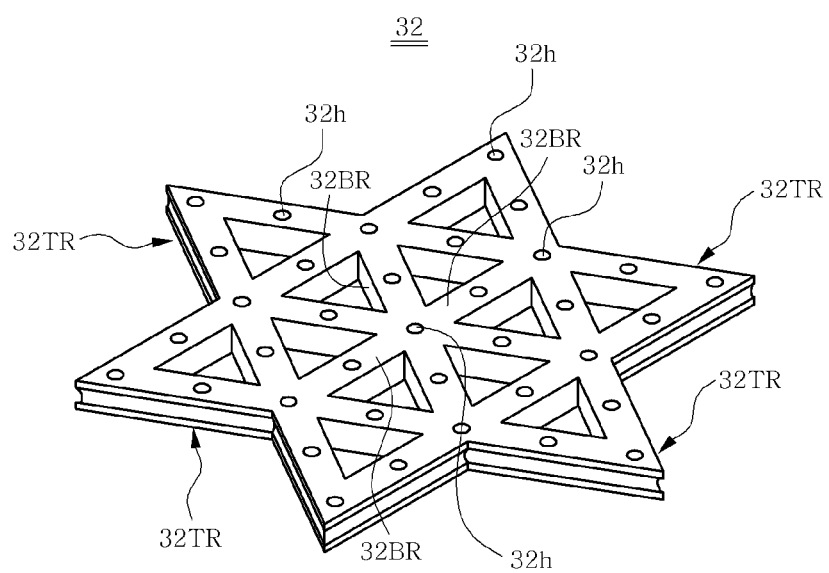
FIG. 4 is a perspective view of the holder which is the main part illustrated in FIG. 3.
Figure 5:
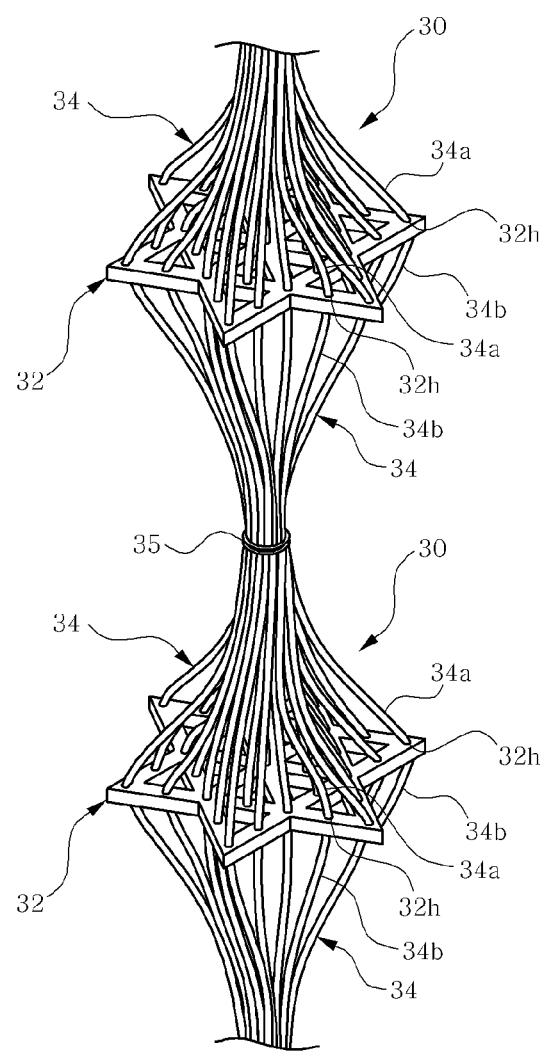
FIGS. 5 and 6 are the perspective views showing some part of the evaporation rope module in which the evaporation ropes are combined in the holder illustrated in FIG. 4.
Figure 6:
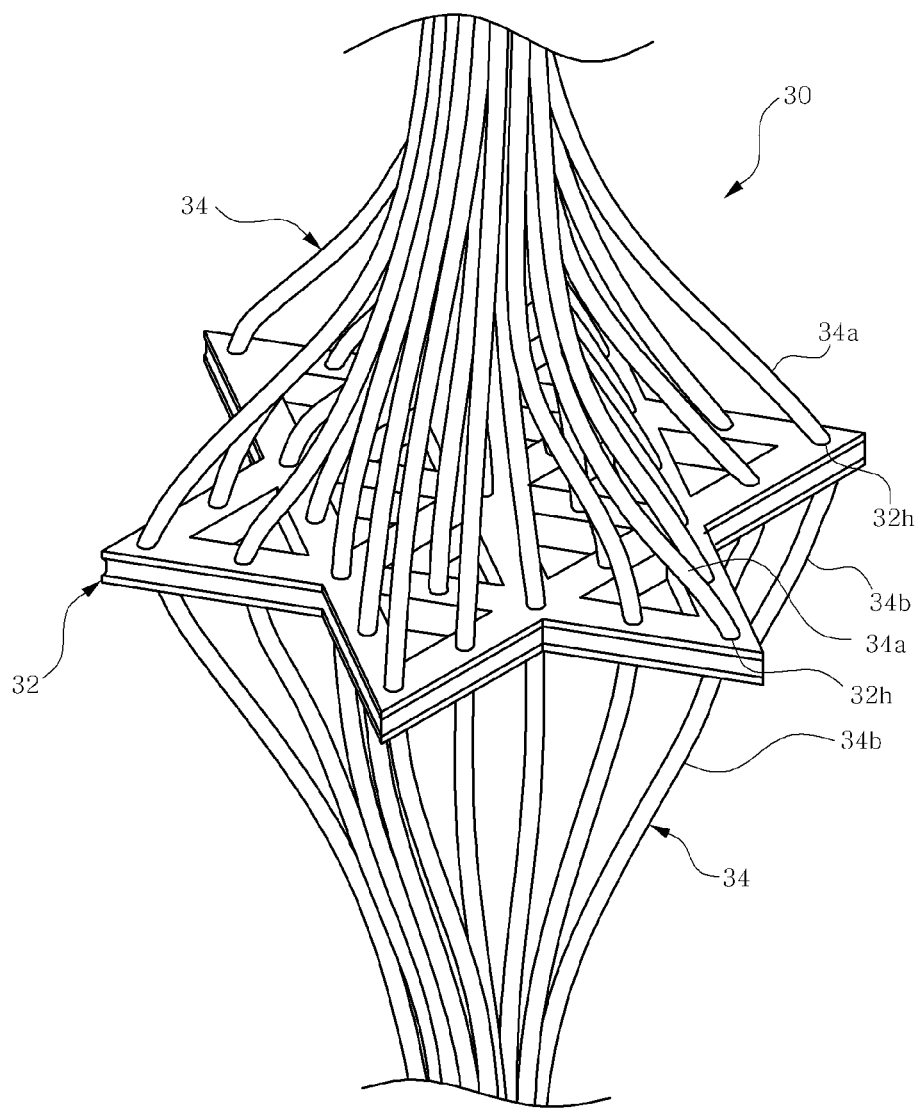
Figure 7:
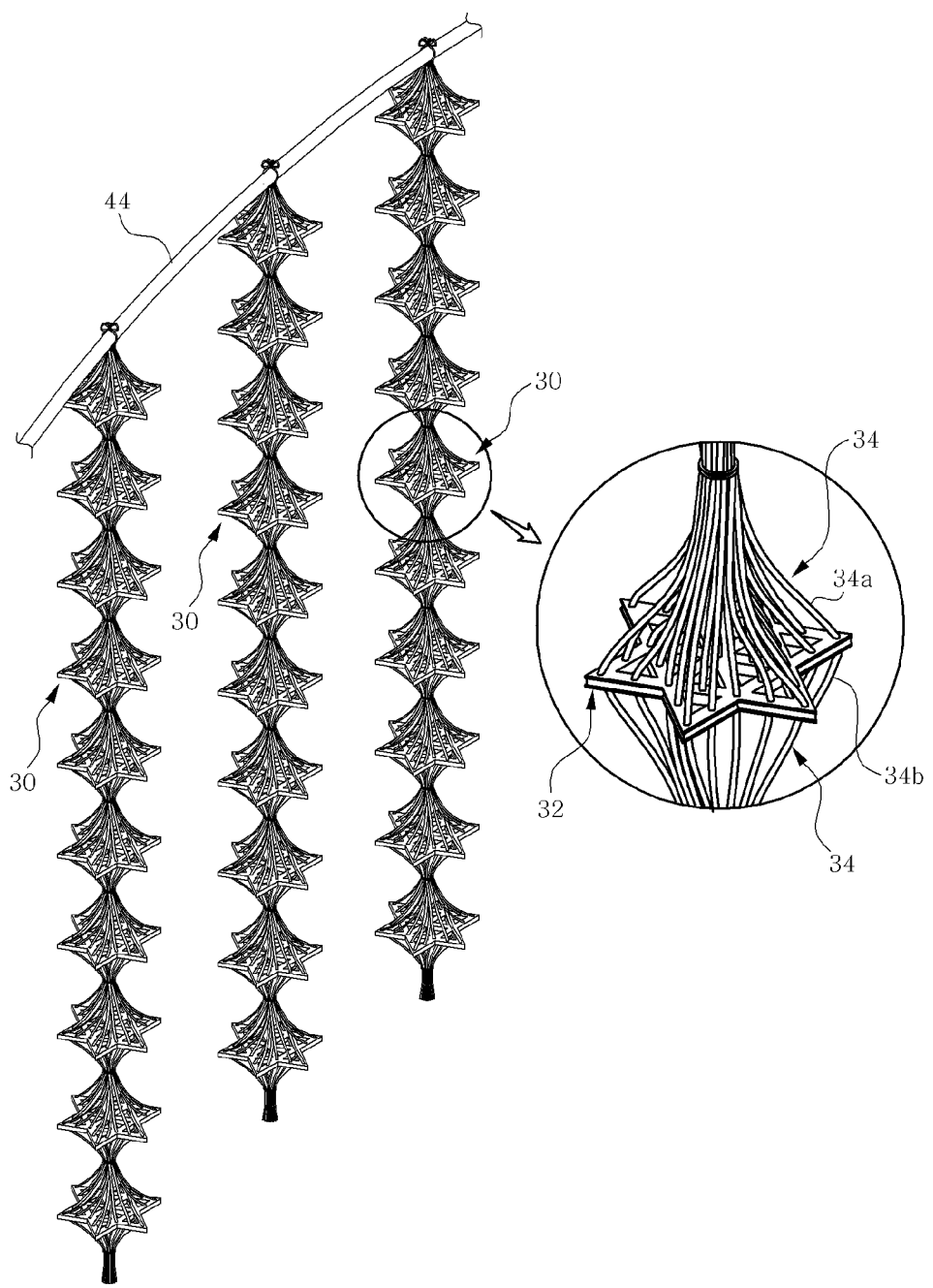
FIG. 7 is the perspective view some part of the installation state of the evaporation rope module illustrated in FIG. 3.
Figure 8:
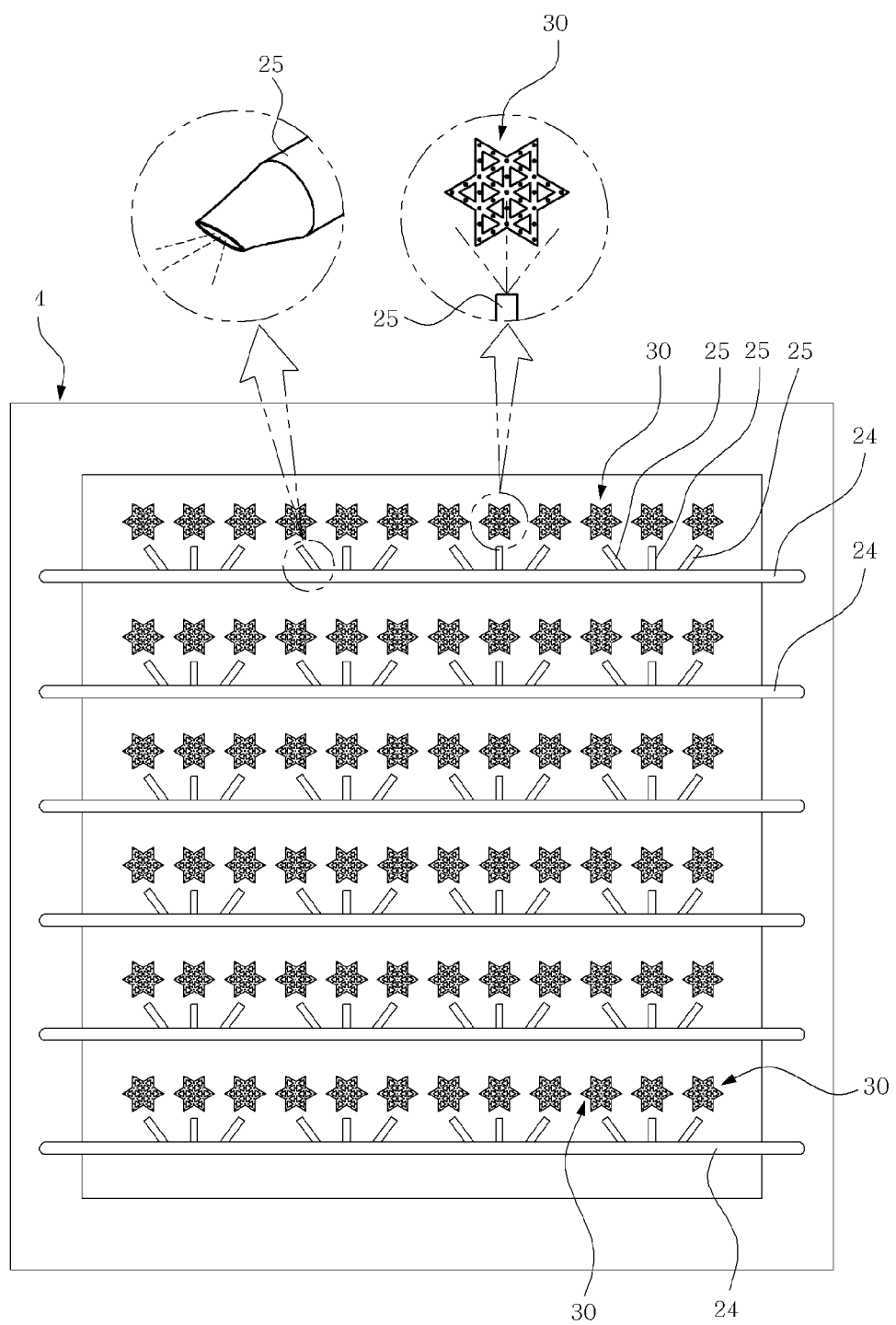
FIG. 8 is a plane view schematically showing the main part configuration of the high efficiency seawater evaporation apparatus according to the invention.
Figure 9:
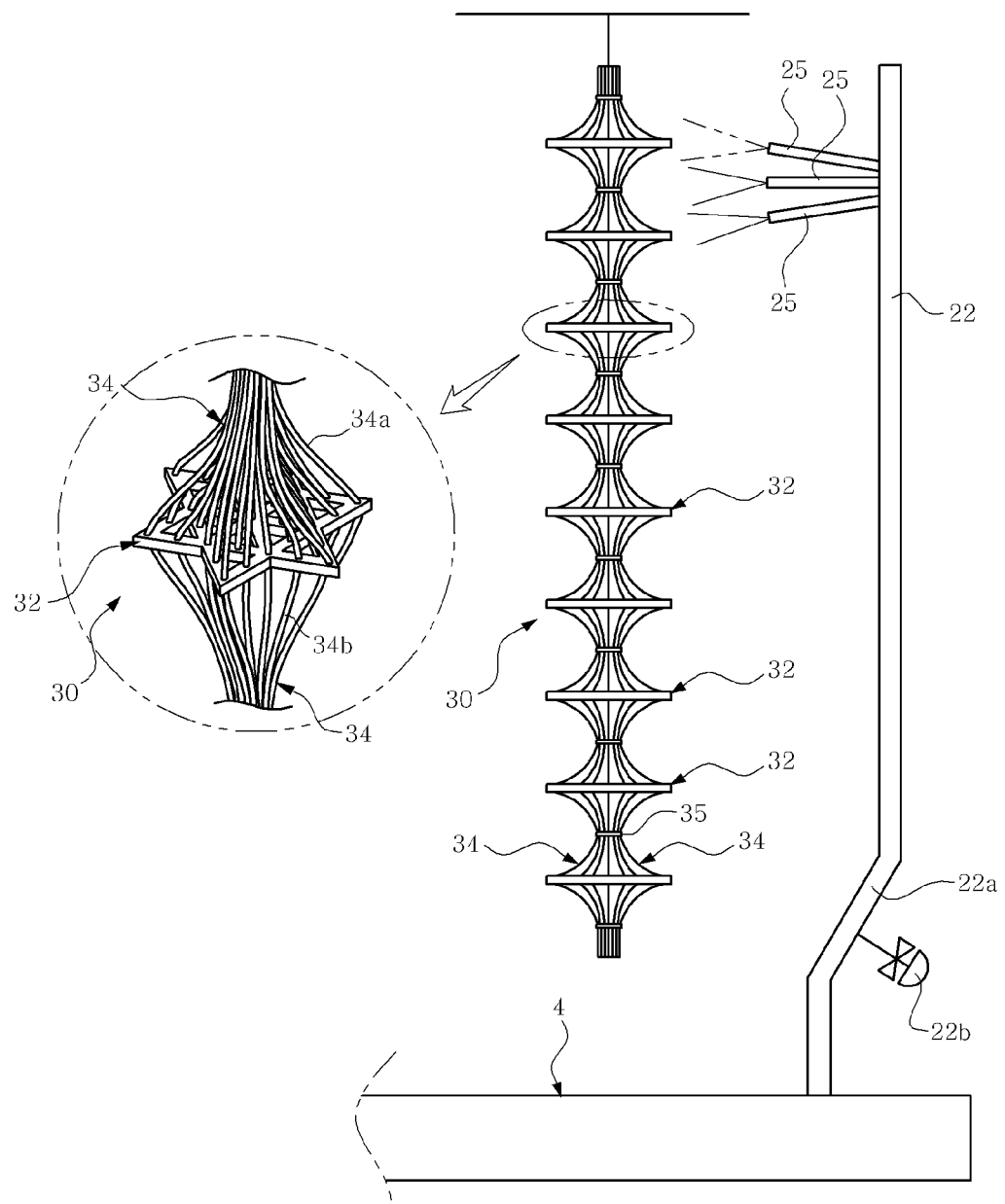
FIG. 9 is one side view which schematically shows the configuration of the evaporation rope module and the seawater pumping pipe called the main part of the showering unit.

The holder 32 may be comprised of various shapes. For example, the holder 32 may be the star shape as shown in FIG. 4. The holder 32 of the star shape includes a plurality of the triangular shape parts 32TR which are arranged along the radial direction in a predetermined interval and a plurality of the bridge portions 32BR which are extended as the straight type and are arranged in the inside of the triangular shape part 32TR. Both ends of the bridge portion 32BR are connected to the inner side the triangular shape part. In the holder 32, multiple rope holes 32h penetrated from the upper side to the bottom side are equipped. The rope hole 32h is penetrated from the upper surface to the bottom surface of the triangular shape part 32TR and the bridge portion 32BR of the holder 32. Approximately, thirty seven rope holes 32h are provided at the holder 32. Moreover, the holder 32 is equipped with the spaces penetrated from the upper surface to the bottom surface of the triangular shape part 32TR and the bridge portion 32BR. And, in the side part of the holder 32, the groove portion concavely formed into the center direction (in other words, the inside direction of the holder 32) is equipped.

The evaporation rope 34 of one strand is inserted in the rope holes 32h penetrated from the upper side to the lower side of the holder 32 so that the evaporation rope 34 may pass through the holder 32. The rope holes 32h of the holder 32 is each other separated in a predetermined interval. Therefore, each evaporation rope 34 is not contacted each other but each evaporation rope 34 is separated each other in a predetermined space.

The respective evaporation ropes 34 pass through the respective rope holes 32h of the multiple holders 32 which are arranged along the upper and lower direction as a predetermined interval. Therefore, the evaporation rope module 30 in which a plurality of evaporation ropes 34 and a plurality of the holders 32 are combined each other. The respective evaporation ropes 34 may be collected toward the center direction (in other words, the center direction of the evaporation rope module 30) by the gripping portion 35 equipped between the respective holders 32. The evaporation rope 34 may have the structure of general rope wherein multiple thin threads of the fabric material are weave each other or may be comprised of various material such as fabric material (for example, sponge and so on). The gripping portion 35 may be formed by the string which is the same material as the evaporation rope 34 and is tied around the outer periphery of the evaporation ropes 34. In that way, the structure may be provided that multiple evaporation ropes 34 are collected in the center direction of the evaporation rope module 30 with the gripping portion 35. The gripping portion 35 may also be formed with the circular ring shape and the structure may also be provided that the respective evaporation ropes 34 are tied together by the gripping portion 35. Anyway, the structure wherein the respective ropes 34 are gathered to be tied up each other may be employed as the gripping portion 35 of the invention.

At this time, because the gripping portion 35 is provided between the respective holder 32 and gathers the respective evaporation ropes 34 as the state aligned toward the center part, the respective holders 32 do not stream down along the evaporation rope 34 but maintain the state combined with the evaporation ropes 34 while the space may be secured between the upper holder 32 and the lower holder 32. In this point, the gripping portion 35 has the important function. Because the gripping portion 35 is provided between the respective holders 32 and gathers all the evaporation ropes 34 toward the center part to bind all the evaporation ropes 34, the respective evaporation ropes 34 may be comprised of the collected shape (the tied shape) like as janggu (double-headed drum with a narrow waist in the middle) between the respective holders 32. Therefore, the upper side and bottom side of the respective holders 32 may be supported by the evaporation rope 34. That is, because the respective evaporation ropes 34 may be collected between the holders 32 like as the shape of said janggu by the gripping portion 35, the upper supporting rope part 34a and the lower support rope part 34b may be formed at the respective evaporation ropes 34 and the upper supporting rope part 34a and the lower support rope part 34b of this evaporation rope 34 may respectively support the holder 32 at the upper position and the lower position. Therefore, the respective holders 32 may not be deviated from the normal position but may be aligned steadily in the state that the respective holders 32 may secure the space of the constant interval between the upper position and the lower position. Because the lower support rope part 34b may support the holder 32 at the lower position and the upper rope part 34a may support the holder 32 at the upper position, the holder 32 may be steadily fixed in place and the space of a predetermined distance may be secured between the respective evaporation ropes 34. Because wind or sunlight and so on may pass through the respective spaces secured between the respective evaporation ropes 34, the seawater evaporation surface area may be maximized.

Figure 10:
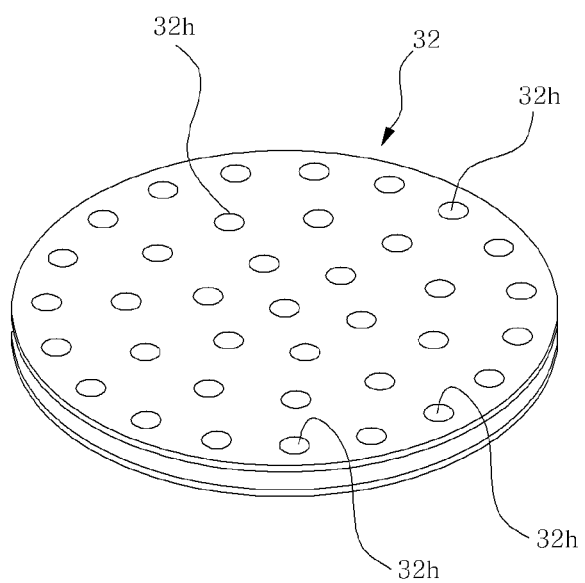
FIG. 10 is a perspective view showing the transformed embodiment of the holder which is the main part of the invention.
Figure 11:
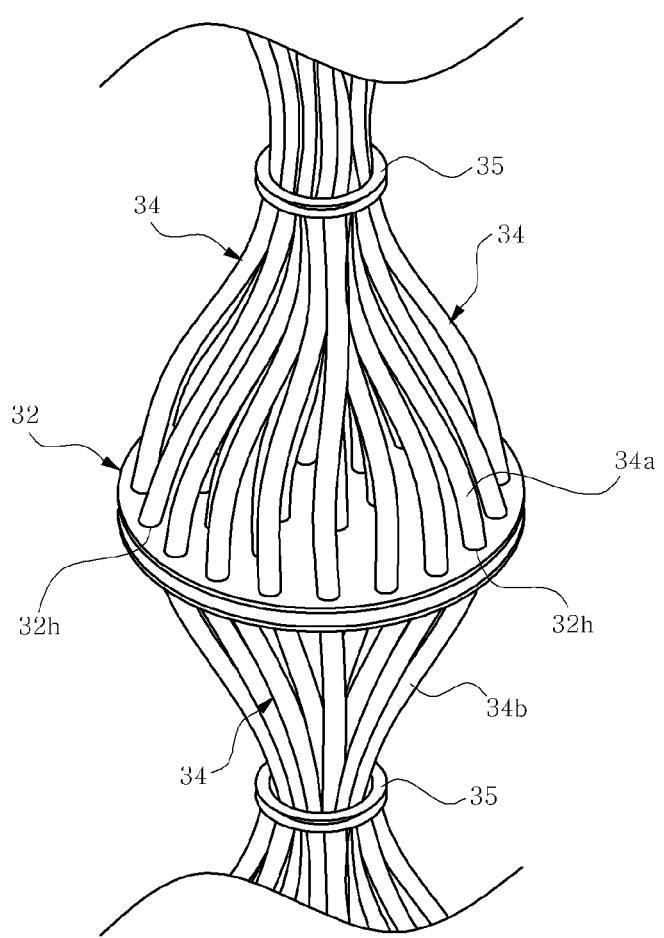
FIG. 11 is a enlarged perspective view of the state where the evaporation rope is combined in the holder illustrated in FIG. 10.

In the meantime, as shown in FIGS. 10 and 11, the holder 32 may be formed of the disk (disk-shape) and the evaporation rope 34 may pass through the upper side to the lower side of the holder 32. The respective evaporation ropes 34 may be inserted into the respective rope holes 32h. In this way, the multiple evaporation ropes 34 are each other separated in a predetermined interval so that the gaps may be secured between the respective evaporation ropes 34. And, multiple evaporation ropes 34 may be comprised of the collected shape like as the shape of said janggu by the gripping portion 35 which also is equipped between the respective holders 32.

As described above, in the invention, the holder 32 may be comprised of various shapes besides the shape in which multiple triangular parts are branched to the radial direction like star pattern or the disc shape.

Figure 12:
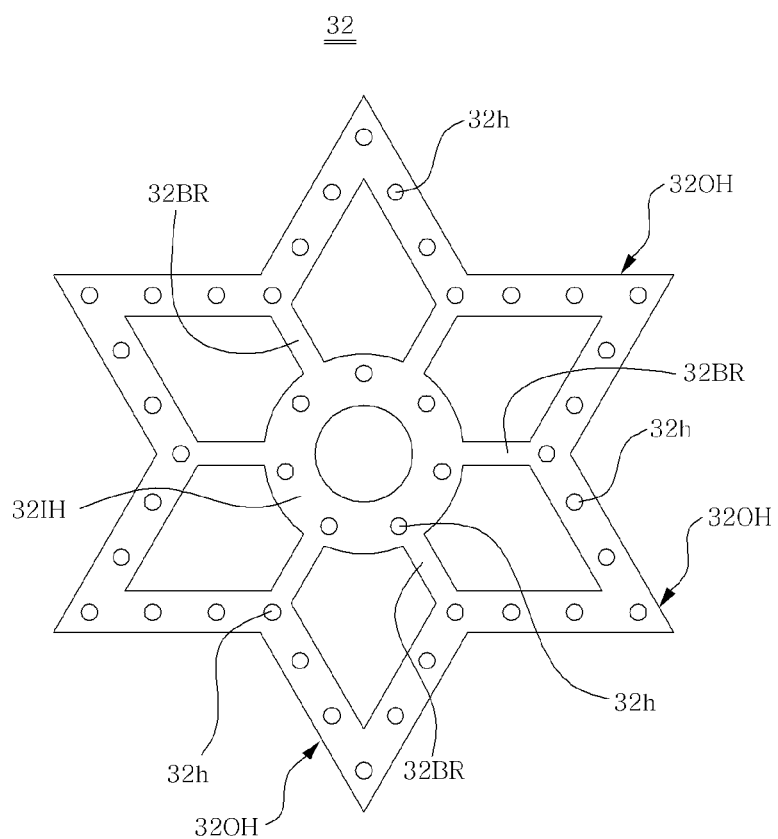
FIGS. 12 to 19 are the plane view showing the transformed embodiment of the holder which is the main part of the present invention.

As described in FIG. 12, the holder 32 can take the structure equipped with a plurality of the outer holder pieces 32OH of trigonal pyramid shape arranged as the radial direction based on the central part and the circular inner holder piece 32IH connected to the outer holder pieces 32OH by multiple bridge pieces 32BR arranged in the inner position of the outer holder pieces 32OH as the radial direction. The rope holes 32h are provided in the outer holder pieces 32OH and the inner holder pieces 32IH and penetrated the holder 32 from the upper surface to the lower surface.

Figure 13:
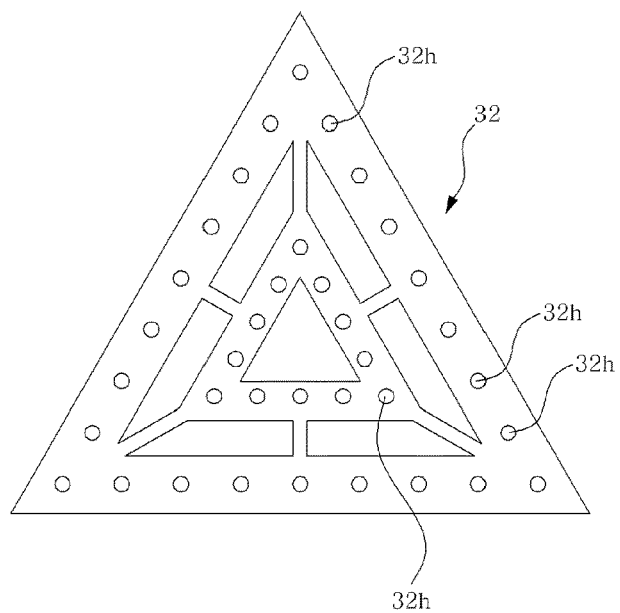

As described in FIG. 13, the holder 32 has the outer holder piece of triangular shape and the inner holder piece of triangular shape which is connected to the outer holder piece by the bridge piece and is arranged in the inner position of the outer holder piece. The outer holder piece and the inner holder piece may be provided with a plurality of the rope holes 32h penetrating from the upper surface and the lower surface.

Figure 14:
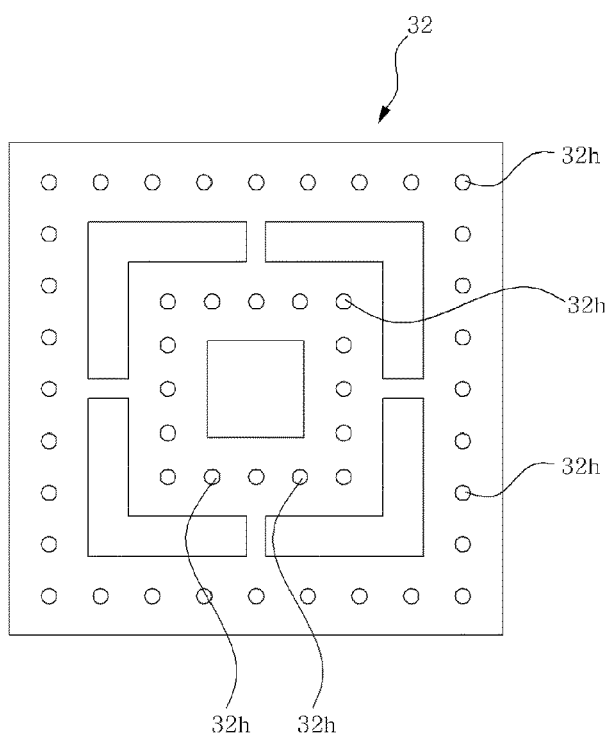

As described in FIG. 14, the holder 32 has the outer holder body of the square closed loop shape and the inner holder body of the square closed loop shape which is connected to the outer holder body by a plurality of the bridge piece and is arranged in the inner position of the outer holder body. The outer holder body and the inner holder body may be provided with a plurality of the rope holes 32h penetrating from the upper surface and the lower surface.

Figure 15:
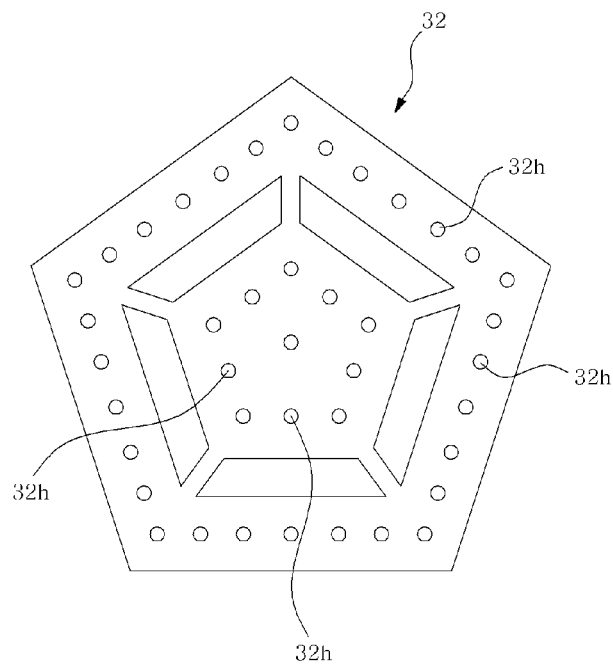

As described in FIG. 15, the holder 32 has the outer holder body of the pentagon closed loop shape and the inner holder body of the pentagon closed loop shape which is connected to the outer holder body by a plurality of the bridge piece and is arranged in the inner position of the outer holder body. The outer holder body and the inner holder body may be provided with a plurality of the rope holes 32h penetrating from the upper surface and the lower surface.

Figure 16:
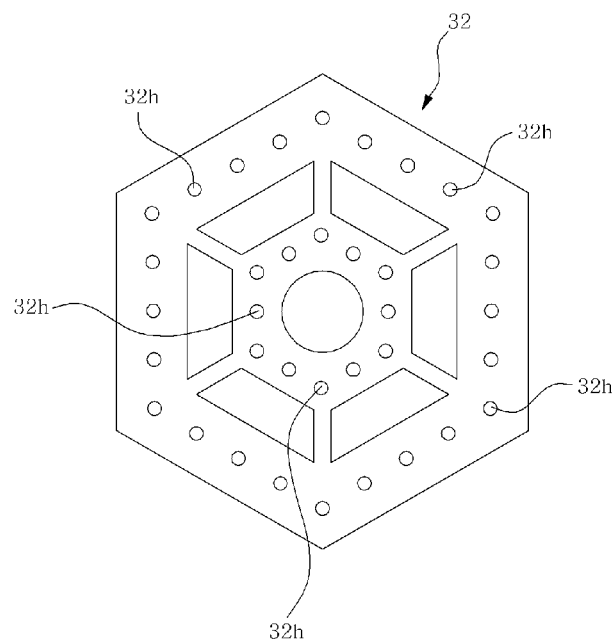

As described in FIG. 16, the holder 32 has the outer holder body of the hexagon closed loop shape and the inner holder body of the hexagon closed loop shape which is connected to the outer holder body by a plurality of the bridge piece and is arranged in the inner position of the outer holder body. The outer holder body and the inner holder body formed of the hexagon closed loop shape may be provided with a plurality of the rope holes 32h penetrating from the upper surface and the lower surface.

Figure 17:
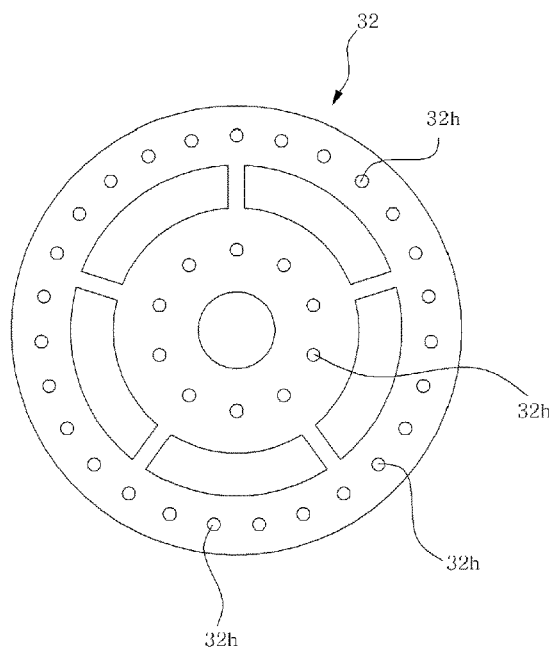

As described in FIG. 17, the holder 32 has the outer ring member of the circular shape and the inner ring member of the circular shape which is connected to the outer ring member by a plurality of the bridge pieces and is arranged in the inner position of the outer ring member. The outer ring member and the inner ring member may be provided with a plurality of the rope holes 32h penetrating from the upper surface and the lower surface.

Figure 18:
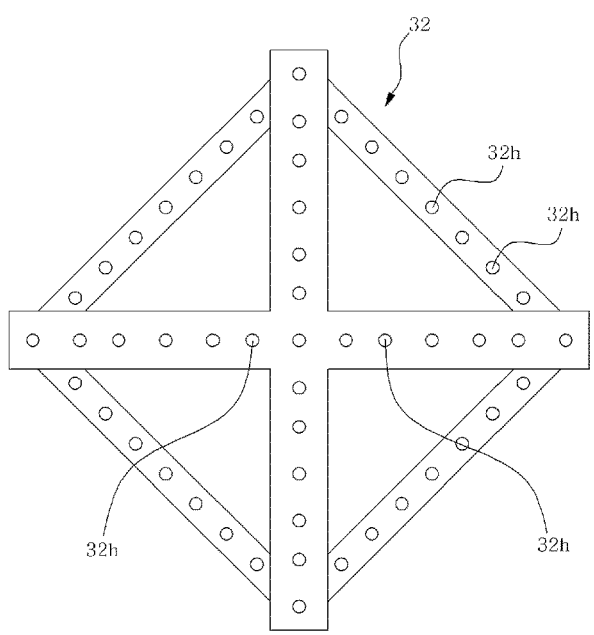

As described in FIG. 18, the holder 32 has the edge holder body of the rectangular shape and the cross shape holder body provided at the edge holder body. The edge holder body of the rectangular shape and the cross shape holder body may be provided with a plurality of the rope holes 32h penetrating from the upper surface and the lower surface.

Figure 19:
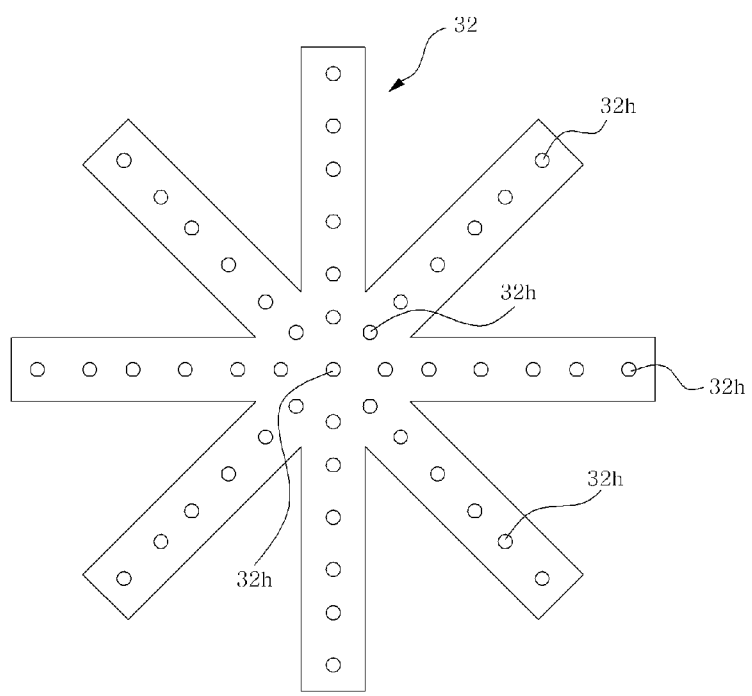

Moreover, as described in FIG. 19, the holder 32 has the structure wherein a plurality of the holder body pieces are branched to the radial direction like as the starfish shape based on the central part. The respective holder body pieces may be provided with a plurality of the rope holes 32h penetrating from the upper surface and the lower surface.

The above-described holders 32 of various shapes are some of the embodiments of the invention. All of the holders 32 are provided with a plurality of the rope holes 32h and the respective evaporation ropes 34 is inserted in the respective rope holes 32h so that the respective evaporation ropes 34 may be separated from each other by a predetermined interval. In this point, all of the above-described holders 32 may have the common characteristic in this point.

In the invention, the upper end portion of the evaporation rope module 30 is supported by the support frame 40 and the evaporation module is installed along the upper and lower direction. And multiple evaporation rope modules 30 are arranged along the front and rear direction as well as the left and right direction of the saltpan 4 by the support frame 40. In other words, multiple evaporation rope modules 30 are arranged in the saltpan 4 as cubic form. That is, when looking at the saltpan 4 at the upper position, multiple evaporation rope modules 30 are arranged along the line direction and the column direction at the state that the respective evaporation rope modules 30 are separated from each other by a predetermined interval.

Specifically, the support frame 40 is installed in the saltpan 4. And, multiple support hanger bars 44 are provided at the support frame 40. The support hanger bar 44 is extended to the direction intersecting the support post which is arranged along the upper and lower direction. The support hanger bar 44 is placed toward the direction which is in opposite direction to the surface of the saltpan 4 for hanging the upper end portion of the evaporation rope module 30 and setting up the evaporation rope module 30 along the vertical direction. That is, the support post 42 is installed in the saltpan 4 along the vertical direction, a plurality of the support posts 42 are arranged as the constant interval along the saltpan 4, and both end parts of the support hanger bar 44 are connected in each support post 42. A plurality of the support hanger bars 44 are place toward the direction which is in opposite directions to the saltpan 4 and the respective support hanger bars are separated from each other by a predetermined interval. Preferably, although it is no illustrated, at least one supporting bar intersecting the respective support hanger bars 44 is connected to the respective support hanger bars 44 so that the respective hanger bars 44 may be securely connected by the supporting bar. If each support hanger bar 44 is connected to two or more supporting bars as the lattice type, the supporting structure of the support frame 40 (especially, the support hanger bar 44) for hanging a plurality of the evaporation rope modules 30 may be stabilized more.

The upper end portion of the evaporation rope module 30 is fixed to each support hanger bar 44 of the support frame 40 and the respective evaporation rope modules 30 may be set up in the saltpan 4 along the vertical direction. By binding the evaporation rope 34 of one strand upwardly lengthened from the evaporation rope module 30 to the support hanger bar 44 of the support frame 40, the upper end portion of the evaporation rope module 30 may be fixed to the support hanger bar 44 and the evaporation rope module 30 may be arranged in the saltpan 4 along the vertical direction. By providing the hanger member of approximately hook shape at the evaporation rope 34 of one strand among the evaporation rope 34 and hanging the hanger member in the support hanger bar 44 of the support frame 40, the respective evaporation rope module 30 may be installed in the saltpan 4 along the vertical direction. The hanger means for fixing the evaporation rope module 30 on the support hanger bar 44 of the support frame 40 and setting up the evaporation rope module 30 in the saltpan 4 at the erect state may be employed as the erect installation fixing means of the evaporation rope module 30.

Moreover, it is desirable that at least the support hanger bar 44 of the support frame 4 is able to ascend and descend along the vertical direction. For example, the support frame 40 includes the fixing frame sleeve 42 the lower end portion of which is fixed on the saltpan 4 and which is arranged along the perpendicular direction and the lift frame bar 43 in which the support hanger bar 44 is connected and which is combined in the fixing frame sleeve and may ascend and descend along the fixing frame sleeve. The lift frame bar and the support hanger bar 44 connected to the lift frame bar may be ascended and descended by the elevation operation means such as the winch and so on connected to the lift frame bar with rope. The winch may be mounted on the support stand (not shown) and the lift frame bar may be connected to the winch by the rope. While operating the winch, the lift frame bar and the support hanger bar 44 equipped with the lift frame bar may be ascended and descended, and while ascending or descending the support hanger bar 44, the evaporation rope module 30 may be spread to the vertical direction to be set up along the perpendicular direction or may be folded compactly. As described above, the fixing frame sleeve 42 is installed at the saltpan 4 along the vertical direction, the respective lift frame bars 30 extended from both ends of the support hanger bar 44 along the vertical direction are slidably combined to the fixing frame sleeve 42, the evaporation rope module 30 is connected to the support hanger bar 44, and the winch is connected to the lift frame bar 43 by the connection means such as the rope. Therefore, after the evaporation rope module 30 is erected by elevating the support hanger bar 44, the worker may hangs the hanger clip of the rope connected to the lift frame bar 43 on the fixing collar 52 equipped in the unillustrated support stand after he/she climbs up the ladder provided at the support stand. Therefore, because the evaporation module 30 may be steadily combined to the support stand by its weight and so on, the state that the evaporation rope module 30 is spreaded along the vertical direction may be maintained stably. At this time, in case of including the supporting bar respectively connected to the support hanger bar 44, the support hanger bar 44 of the lattice form may be raised at a time. In the meantime, in the invention, it is natural that the upper end portion of the evaporation module 30 may be connected to the respective hanger bars 44 installed at the upper position of the saltpan 4. The configuration for moving the support hanger bar 44 connected to the lift frame bar 43 along the upper and lower direction may be adopted as different elevation means besides the winch.

The invention may further include the overflow water pool 50. The overflow water pool 50 may be formed by digging the ground around the saltpan 4. The overflow water pool 50 is the water tub structure capable of containing water. At this time, the height of the overflow water pool 50 is formed in the position relatively lower than the bottom surface of the saltpan 4, and the bottom surface of the saltpan 7 and the overflow water pool 50 are connected by the by-pass channel 52. As shown in FIGS. 1 and 2, while the seawater is flowing down along the evaporation rope module 30, the mud is heaped up in the bottom surface of the saltpan 4 and the water may be flowed into the overflow water pool 50 through the by-pass channel 52.

In the result, the overflow water pool 50 is connected to the bottom surface of the saltpan 4 and the overflow water pool 50 is connected to the reservoir (the reservoir for the seawater storage) by pipe etc. And, the valve is provided at the pipe and so on for connecting the storage pool 12 and the overflow water pool 50. The pump P may be equipped on the pipe. At this time, the storage pool 12 may be comprised of the first storage pool 12a and the second storage pool 12b. And the second storage pool 12b may be connected to the overflow water pool 50. The first storage pool 12a may be connected to the reservoir where the seawater has been leaded or may be directly connected to the sea.

The pump P is connected between the overflow water pool 50 and the showering unit for supplying the seawater to the evaporation rope module 30. That is, because the pump P is equipped on the seawater pumping pipe 22 connected to the overflow water pool 50, the structure in which the pump P is connected to the respective dispersion pipes 24 of the horizontal direction for supplying the seawater to the evaporation rope module 30 may be acquired. Moreover, the showering unit is connected to the crystallizing pond 6 next to the saltpan 4. The respective dispersion pipes 24 of the showering unit are connected to the crystallizing pond by the connection pipe 28. Therefore, while the seawater flowing into the respective dispersion pipes 24 may flow down along the respective evaporation ropes 34 of the evaporation rope module 30 and the enriched water is made, the enriched water may be supplied to the crystallizing pond 6 through the connection pipe 28 connected to the seawater pumping pipe 22 of the showering unit. In the meantime, the valve 28a is respectively equipped in the dispersion pipe 24, and the enriched water supplied to the dispersion pipe 24 may be supplied or stop supplying according to opening and shutting of the valve 28a. In the meantime, the concentration of the salt 8 of the enriched water going over to the crystallizing pond 6 is about 15% to out 25% by weight. For convenience, the enriched water going over to the crystallizing pond 6 is called as the seawater in the below description.

The valve is equipped on the connection pipe 28 between the dispersion pipe 24 of the showering unit and the crystallizing pond 6. The valve is connected to the salinometer 27 arranged at the connection pipe 28 between the dispersion pipe 24 of the showering unit and the crystallizing pond 6. According to the concentration of the salt 8 sensed by the salinometer 27, the valve is configured to be opened and closed. If the salinometer 27 senses the concentration of the salt 8 of the seawater as about 15% to 25%, the valve is opened and the seawater (the enriched water) is handed over the crystallizing pond 6.

In the meantime, the seawater is led from the sea and stored in the reservoir. In the invention, the storage pool 12 which is connected to the reservoir by the pipe and so on may be included, the overflow water pool 50 is connected to the storage pool 12 by the pipe and so on, and the pump P and the valve may be provided on the pipe for connecting the storage pool 12 and the overflow water pool 50. At this time, the storage pool 12 may comprise the first storage pool 12a connected to the reservoir by the pipe and so on and the second storage pool 12b connected to the first storage pool 12a by the pipe and so on. The pump P and the valve etc may also be installed at the pipe connected between the first storage pool 12a and the second storage pool 12b.

The overflow water pool 50 may be connected to the second storage pool 12b by pipe etc. The valve 54 may be installed in the pipe connecting between the second storage pool 12b and the overflow water pool 50. The valve 54 is opened to supply the seawater stored in the storage pool 12 (the second storage pool 12b in FIG. 1) to the overflow water pool 50 and it is closed to stop supplying the seawater. The overflow water pool 50 may be called as the third storage pool. The third storage pool, the first storage pool and the second storage pool 12 may organize the storage pool 12 of the invention. The respective dispersion pipes 24 of the showering unit and the overflow water pool 50 are supplied to the respective evaporation rope modules 30 by the seawater pumping pipe 22 installed at the saltpan 4, and the pump P is installed at the middle connection pipe 28 which connects the seawater pumping pipe 22 to the overflow water pool 50 or the pump P may be installed at the seawater pumping pipe 28 itself. In this case, the seawater filled in the overflow water pool 50 may be pumped by the pump P and may be supplied to the respective evaporation rope modules 30 through the dispersion pipe 24. At this time, the middle connection pipe 28 may be arranged around the saltpan 4 and may be connected to the lower end portion of the respective seawater pumping pipe 22. And, the middle connection pipe 28 is connected to the overflow water pool 50.

Moreover, in the invention, the structure of over blow storage pool 12 and evaporation rope module 30 may be once more included in the crystallizing pond 6 for segregating the salt 8. That is, multiple evaporation rope modules 30 supported by the support frame 40 are installed at the bottom surface upper position of the crystallizing pond 6 along the vertical direction, the other overflow water pool 50 is connected in the crystallizing pond 6 through the by-pass channel 52, and the seawater stored in the overflow water pool 50 may be once more supplied to the respective evaporation rope modules 30 by the showering unit once more equipped in the crystallizing pond 6. The invention has the structure of segregating the salt 8 in the crystallizing pond 6 after once more evaporating the moisture of seawater coming over from the saltpan 4 using the evaporation rope module 30.

The overflow water pool 50 may be formed by digging the earth around the saltpan 4. The ball-top (buoyant ball) is provided in the overflow water pool 50 and the sensor for detecting the water level with the ball-top is provided in the overflow water pool 50. Therefore, if the ball-top is lifted over the standard water level, the seawater filled in the overflow water pool 50 may be supplied to the respective evaporation rope modules 30 through the pump P and the showering unit.

If the circulation of the seawater between the overflow water pool 50 and the evaporation rope module 30 are continued, the salt concentration of the seawater will rise more and the seawater with the appropriate salt concentration (approximately, the salt concentration of about 15% to 25%) may be handed over to the crystallizing pond 6.

In the meantime, if the seawater of the overflow water pool 50 goes to the crystallizing pond 6, the sea water stored in the storage pool 12 is again re-injected to the overflow water pool 50. The circulation process of the seawater between the overflow water pool 50 and the evaporation rope module 30 as described above may be repeated. If the new seawater is supplied to the overflow water pool 50, the salt concentration of the seawater will be lowered. Therefore, the enriched water (the water of the high salt concentration) is may be made by repeating the process that the seawater having a low salt concentration is repeatedly circulated between the evaporation rope module 30 and the overflow water pool 50. At this time, the valve provided at the pipe and so on maintains the locked state while the circulation process of the seawater is being performed between the evaporation rope module 30 and the overflow water pool 50. Only when the locking state of the valve is maintained during the circulation of the seawater, the seawater is circulated only between the evaporation rope module 30 and the overflow water pool 50 so that the seawater may be changed into the enriched water having the appropriate salt concentration and the enriched water having the appropriate salt concentration may be supplied to the crystallizing pond 6. At this time, the overflow water pool 50 is equipped in the position which is lower than the reservoir 12 and the saltpan 4. The seawater may come in the overflow water pool 50 by the autogenous pressure (in other words, the difference of water pressure). In the meantime, according to the invention, the seawater is directly supplied to the respective dispersion pipes 24 of the showering unit and the seawater may be directly sprinkled to the evaporation rope module 30 from the storage pool 12. Therefore, it is natural that the seawater (the enriched water) having the appropriate salt concentration (in other words, the salt concentration of about 15% to 25%) may be supplied to the crystallizing pond 6.

The invention comprises the crystallizing pond 6 for receiving the enriched water which flows along the evaporation rope 34 in the saltpan 6 and the salt concentration of which is increased. And, the salinometer 27 for measuring the salinity of the seawater (the enriched water) which is concentrated in the saltpan 4 may be provided between the saltpan 4 and the crystallizing pond 6.

The showering unit has a plurality of the dispersion pipes 24 arranged at the upper position of the evaporation rope module 30. Two or more nozzles are equipped at the respective dispersion pipes 24 and the nozzles are extended to the position nearby the evaporation rope module 30. The seawater may be supplied to the respective evaporation rope modules 30 through the nozzle. Preferably, the nozzle has the jet propulsion sleeve part whose cross sectional area becomes gradually smaller from the base part to the front end part, and the jet hole is provided in the end of the jet propulsion sleeve part.

According to the invention of the above-mentioned configuration, in the state that the support frame 40 supports the evaporation rope modules 30 and the evaporation rope modules 30 are arranged to be erected along the vertical direction, if the seawater is supplied to the respective evaporation rope modules 30 through the showering unit (more exactly, the respective dispersion pipes 24), while the seawater is streaming down along the surface of the respective evaporation ropes 34 with gravity, the evaporation surface area of the seawater may be maximized so that the evaporation rate of the seawater may be accelerated to the utmost. And, the seawater (in other words, the seawater with high rate of the salt amount) in which the salt concentration becomes higher may be collected in the saltpan 4 under the evaporation rope modules 30 and the evaporation rate of the seawater may be accelerated even in the saltpan 6. In the meanwhile, in case of the evaporation rope module 30 itself, because the respective evaporation ropes 34 are arranged in the state that they are separated from each other by a predetermined space, the sunlight enters through the empty space between the respective evaporation ropes 34 and the sea wind may pass through the space between the respective evaporation ropes 34. Therefore, the case that the evaporation rope modules 30 are swung by the sea wind may be minimized. At the same time, because the evaporation area of the seawater may be maximized, the seawater evaporation time reduction efficiency for the salt precipitation is maximized.

In the invention, the seawater with the salinity of about 22%~3% may be continuously supplied to the evaporation rope module 30 arranged at the upper position of the seawater evaporation apparatus by the pump P and while the seawater flows down with gravity along the respective evaporation ropes 34, the moisture of the seawater may be evaporated so that the seawater the salt concentration of which is high may be obtained. Approximately, the seawater (the enriched water) having the salt concentration of about 15% to 25% may be obtained. And the seawater of this high salt concentration may be passed to the crystallizing pond 6 and the salt 8 (especially, the sea salt) may be segregated.

Moreover, the evaporation rope modules 30 may be maintained as the hexahedron shape (that is, the cubic rope block shape such as dice block shape) in the state that they are combined to the support stand to be erected along the vertical direction, and the evaporation rope modules 30 may be folded in the flat shape (that is, the flat form) because they have the structure that a plurality of the evaporation ropes 32 are weaved together. When the typhoon rises, the evaporation rope 34 may be descended by the winch and so on to be folded in the flat shape. Accordingly, the damage such as the evaporation rope 34 is tumbled down or is blown away or is torn out may be prevented effectively.

Particularly, in the invention, the moisture of the seawater is evaporated while the seawater flows down with gravity along the respective evaporation ropes 34 of the evaporation rope module 30. Because the respective evaporation ropes 34 are each other separated in a predetermined interval by the holder 32, the evaporation surface area that the seawater is exposed to air and sunlight may be maximized while the seawater is flowing down along the evaporation rope 34 and the evaporation rate of the moisture of the seawater may be accelerated to the utmost. And, like this, since the evaporation rate of the seawater is accelerated to the utmost and the seawater concentration (that is, the rate of the salt amount of the seawater) may be heightened considerably fast, the evaporation rate of the seawater may be accelerated. According to the invention, because the evaporation rate of the seawater may be accelerated to the utmost while the seawater flows down along the upper and lower position, the time to segregate the salt 8 in the crystallizing pond 6 may be shortened to the utmost and the salt productivity is increased as much as the salt precipitation time is shortened.

In other words, the main characteristic of the invention is that because the evaporation rope module 30 wherein multiple evaporation ropes 34 are tied up with group may be provided, the seawater is not jammed at the horizontal direction but the seawater altogether may flows down along the upper and lower direction. In the state that the evaporation rope module 30 is erected along the vertical direction by hanging the evaporation rope module 30 to the support frame 40 like as hanging the clothes to the dress hanger, if the seawater is supplied to the evaporation rope module 30, even the minute amount of the seawater is not jammed but all amount of the seawater may flow down toward the lower direction and all the seawater may be evaporated exhaustively and the evaporation rate of the seawater may be remarkably accelerated by the maximization of the evaporation area of the seawater. Like this, because he evaporation rate of the seawater may be remarkably accelerated, the invention may have the various advantages that the precipitation time of the salt may be shortened and the effectiveness may be increased in the workability or the cost. In the evaporation rope module 30, because the respective evaporation ropes 34 is spaced each other by a predetermined interval, air or the sunlight enters through the respective evaporation ropes 34 and the effect of the evaporation rate improvement of the seawater may be expected. What is the most important characteristic of the invention is that the seawater evaporation rate may be maximized because the seawater always moves along the upper and lower direction of the evaporation rope module 30.

Moreover, in the invention, the respective dispersion pipes 24 which supplies the seawater is slantly arranged and the clay ingredient mixed in the seawater is not piled up inside the dispersion pipe 24 but streams down outwardly. Therefore, the case may be authentically prevented that the dispersion pipe 24 is blocked by the clay ingredient and is not properly operated.

Moreover, in the present invention, the seawater (at this time, the seawater is the water where the salt 8, mud and water and so on are together mixed together) flowing down along the respective evaporation ropes 34 of the evaporation rope module 30 installed at the saltpan 4 along the upper and lower direction may be piled in the bottom surface of the saltpan 4. Here, because the separate overflow water pool 50 is connected in the saltpan 4, mud is exposed to the atmosphere and the seawater except for mud comes off from the saltpan 4 to be stored in the overflow water pool 50. And, the seawater stored in the overflow water pool 50 is pumped to the respective dispersion pipes 24 of the showering unit through the pump P and is resupplied to the respective evaporation rope modules 30. Therefore, the seawater evaporation acceleration is more and more increased. In the invention, the circulation process may be repeatedly performed that the seawater is stored in the overflow water pool 50 and the seawater stored in the overflow water pool 50 is resupplied to the evaporation rope module 30. Therefore, because the seawater is not stopped but is continuously circulated, the function for maximizing the seawater evaporation acceleration may be more authentically performed.

Moreover, in the invention, because the salinometer 27 measuring the salinity of the seawater (the enriched water) which is concentrated in the saltpan 4 is provided between the saltpan 4 and the crystallizing pond 6 and the salinometer may accurately sense the concentration of the seawater and may pass over the enriched water to the crystallizing pond 6. Therefore, the salt precipitation efficiency may be enhanced. By repeating the process of evaporating the seawater that the seawater is continuously circulated between the overflow water pool 50 and the evaporation rope modules 30 in the saltpan 4, when the seawater concentrated to the necessary salt concentration (for example, the salt concentration of about 15% to 25%) may be produced and the salinometer 27 senses the appropriate salt concentration during the repeatable circulation of the seawater, the valve is opened according to the sensing signal of the salinometer 27 and the seawater (the enriched water) is handed over to the crystallizing pond 6. Therefore, the accuracy is authentically enhanced as to the salt precipitation task.

Moreover, in the invention, the jet propulsion sleeve part whose cross section area becomes gradually smaller is provided at the nozzles of the respective dispersion pipes 24 for supplying the seawater to the respective evaporation rope modules 30 and the jet hole is provided at the front end part of the jet propulsion sleeve. Therefore, the effect may be expected that the seawater may be uniformly supplied (sprinkled) to all the evaporation rope modules 30 even in case the pressure of the pump P for pumping the seawater is a little bit low. At this time, if the configuration (the jet propulsion sleeve configuration as described above) is provided that the length of the nozzle is prolonged gradually and the front end part of the nozzle is gradually flat, the configuration may be more preferable because the sufficient pressure may be generated although only one pump P for pumping the seawater.

And, in the invention, because a plurality of the space portions which penetrate the holder 32 from the upper surface to the lower surface are provided in the holder 32 itself which supports the evaporation rope module 30 in the state that the respective evaporation ropes 34 are tied with each other, while the seawater is supplied to the evaporation rope module 30 and is flowing down along the evaporation ropes 34, the seawater may flow downwardly through the space portions of the holder 32 and the weight of the seawater is not applied to the holder 32. Therefore, because there is no case that the evaporation rope module 30 is fallen down owing to the excessive load applied to the holder 32, the stabilization of the structure may be ensured.

Moreover, in the invention, by organizing the respective support hanger bar 44 of the support frame 40 which sets up the respective evaporation rope module in the upwardly swollen shape, the invention may have the special effect.

The reason for making the ceiling of the building to the arch is that there is the advantage that the ceiling may bear the load more effectively and the building of the strong structure may be ensured. In the invention, there is also the advantage that the evaporation rope module 30 can be supported to the more strong power by employing the support hanger bar 44 itself to the arcuate. Although the relatively long period has passed after setting up the seawater evaporation apparatus of the invention, the support hanger bar 44 of the arcuate more steadily supports so that the respective evaporation rope modules 30 may not drop down toward the lower position. Therefore, the effect that the lifetime is prolonged may be expected.

In the meantime, it is good to comprise support frame 40, more exactly, the support post 42 and the support hanger bar 44 (it includes the supporting bar in case there is the supporting bar) as bamboo. Bamboo has the advantage that the life time may be remarkably elongated after the seawater evaporation apparatus of the invention is set up because bamboo has the characteristic that is not easily eroded by the salt 8. Moreover, the bamboo has the snatch in the outer periphery by a predetermined interval, when fixing the evaporation rope module 30 to the mode of binding one strand of evaporation rope 34 to the support frame 40 made of bamboo, the articulation part of bamboo functions with support projection. Therefore, the case may be prevented that the evaporation rope 34 slides along the bamboo surface but the evaporation rope module 30 may steadily maintained at the predetermined position.

Moreover, another embodiment of the invention includes the seawater pumping pipe 22, the drain guide portion and the valve. The seawater pumping pipe 22 is connected to the dispersion pipe 24 and is arranged at the upper portion of the saltpan 4. And the seawater pumping pipe is arranged as the horizontal direction. The daring guide portion is equipped at one side of the seawater pumping pipe 22. The valve is installed at the drain guide portion.

In another embodiment of the invention, if the valve 22b of the drain guide portion 22a slanted to be extended downwardly in the seawater pumping pipe 22 is opened, the clay ingredient getting mixed in the seawater flows down along the inner portion of the drain guide portion 22a and is drained to the outside through the valve 22b. Therefore, the case may be prevented that mud is heaped inside the seawater pumping pipe 22 and the operation is not properly performed.

Figure 20:
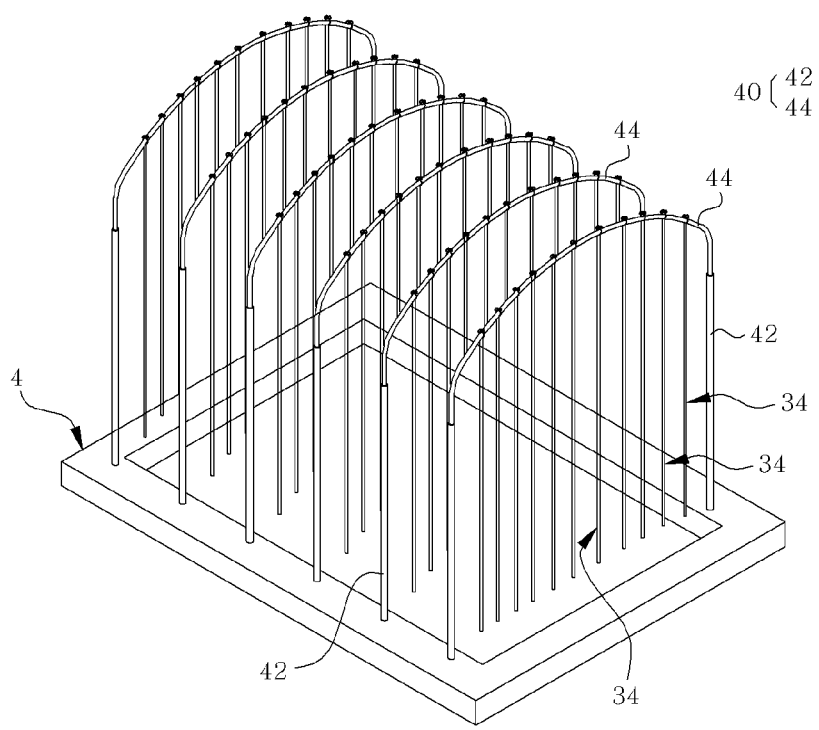
FIG. 20 is a perspective view showing the state setting up the evaporation rope called the main part of the other embodiment of the invention in the saltpan.

In the meantime, the other embodiment of the invention shown in FIG. 20 may comprise the showering unit installed in the saltpan 4 and a plurality of the evaporation ropes 34. The evaporation rope 34 is connected to the support hanger bar 44 and is arrange along the vertical direction. The respective evaporation ropes 34 are separated each other in a predetermined interval. If the seawater is supplied to the showering unit, the seawater may flow down along the respective evaporation ropes 34.

In the other embodiment of the invention, the respective evaporation ropes 34 are independently connected to the respective support hanger bar 44 of the respective support frame 40 installed in the saltpan 4 to be arranged along the vertical direction. Except for the above structure, the other configurations of the other embodiment of the invention are similar to the configurations of the above-mentioned embodiment of the invention. According to the other embodiment of the invention, while the seawater may flow down along the respective evaporation ropes 34, the evaporation acceleration of the seawater becomes higher.

Figure 21:
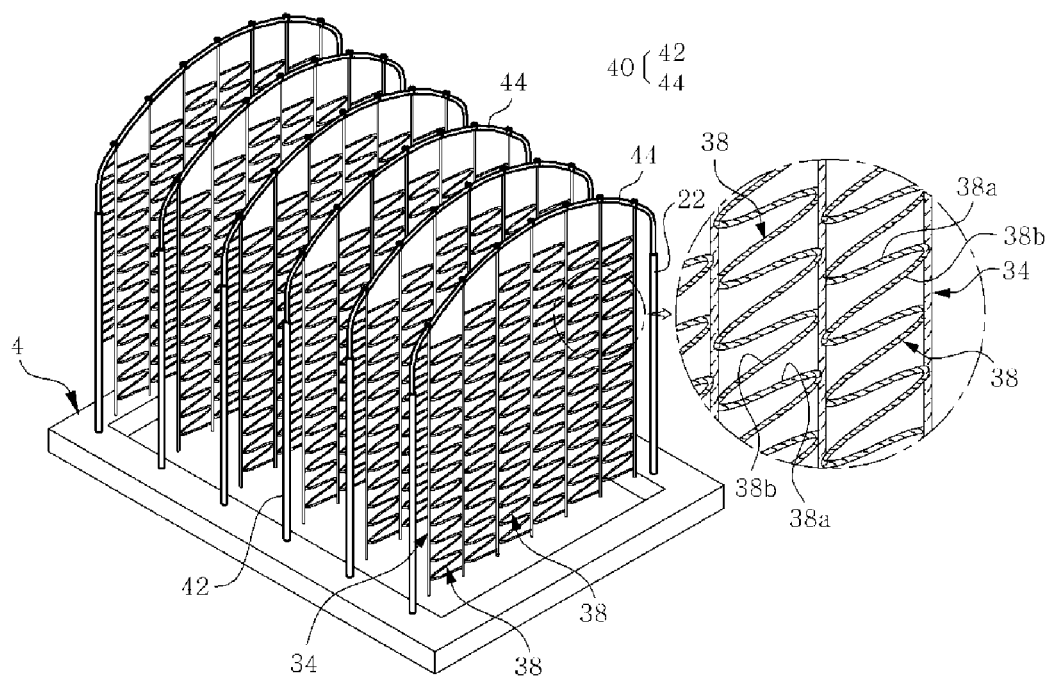
FIG. 21 is a perspective view showing the state setting up the evaporation rope called the main part of the other embodiment of the in the saltpan.

Moreover, in the third preferred embodiment of the invention illustrated in FIG. 21, multiple upper and lower direction evaporation ropes 34 and multiple connection evaporation ropes 38 may be included. The connection evaporation rope 38 of plural number may form the first direction slope rope part 38a and the second direction slope rope part 38b in order to be arranged between two adjacent evaporation ropes 34. The first direction slope rope part 38a and the second direction slope rope part 38b are connected to two adjacent evaporation ropes along the zigzag direction. And, the evaporation rope segment of the net shape is formed with the evaporation ropes 34 and the connection evaporation ropes 38. And the evaporation rope segment support frame 40 of this net shape is connected to the respective support hanger bars 44 of the support frame 40 to be arranged along the upper and lower direction.

In case of the third embodiment of the invention, the seawater may flow down along the respective evaporation ropes 34 arranged along the upper and lower direction as well as may flow down along the first direction slope rope part 38a and the second direction slope rope part 38b. Therefore, the optimization of the seawater evaporation efficiency may be also expected.

Moreover, in the invention, the seawater may flow down along the respective evaporation ropes 34 of the evaporation rope module 30, and mud may be heaped up in the bottom surface of the saltpan 4. The seawater always comes off in the overflow water pool 50 and mud is configured to be always contacted with air. Like this, since the mud piled up in the saltpan 4 may be always contacted with air, the optimal condition of the profitable creature vegetation can be activated. And, consequently the saltpan 4 itself is stabilized to the alive mud flat. Therefore, the invention has the advantage that soil conditioning is not required.

Moreover, in the invention, the control part for spraying the seawater every regular time gap may be connected to the showering unit. The respective dispersion pipes 24 configuring the showering unit are connected to the main seawater pipe and the main valve is provided at the main seawater pipe. The control part is connected to the main valve and the main valve is comprised of the valve which is opened and closed automatically by the control part. By opening the main valve every regular time gap with the control part, the seawater may be intermittently distributed to the evaporation rope module 30.

Therefore, if the seawater is sprinkled intermittently to the evaporation rope module 30, the seawater evaporation efficiency is more increased and due to this and the salt precipitation efficiency may be more enhanced. Therefore, the desirable result may be expected in the several aspects.

What is claimed is:

1. High efficiency seawater evaporation apparatus comprising:
   a showering unit installed at a saltpan;
   an evaporation rope module,
   wherein multiple evaporation ropes are collected in a group by a holder and respective evaporation ropes extend in upper and lower directions,
   wherein the respective evaporation ropes are separated from each other by a predetermined interval,
   and wherein, when the seawater is supplied to the respective evaporation ropes by the showering unit, the seawater flows down along a surface of the respective evaporation ropes and evaporation of the seawater is accelerated.

2. The high efficiency seawater evaporation apparatus of claim 1, comprising a plurality of evaporation rope modules, wherein
   respective evaporation rope modules are arranged in the saltpan along length and breadth directions of the saltpan,
   the respective evaporation rope modules are separated from each other along the length and breadth direction by a predetermined space, and
   while the seawater is flowing down along a respective evaporation rope module, a water vaporization rate of the seawater is accelerated.

3. The high efficiency seawater evaporation apparatus of claim 2, wherein
   a support frame is installed in the saltpan,
   the support frame includes
      a plurality of support posts which are installed at the saltpan, and
      a plurality of support hanger bars which extend to respective support posts of the plurality of support posts and are arranged facing the bottom of the saltpan,
   wherein an upper end portion of the evaporation rope module is hung over a respective support hanger bar and the evaporation rope module is supported by the respective support hanger bar, and
   wherein a middle part of each of the support hanger bars is higher than both end parts of the each of support hanger bars so that the support hanger bar has an arch shape.

4. The high efficiency seawater evaporation apparatus of claim 1, wherein the holder has multiple rope holes in which the evaporation ropes are located.

5. The high efficiency seawater evaporation apparatus of claim 4, wherein
   a plurality of the holders are arranged along upper and lower directions of each of the evaporation ropes in a predetermined interval, and
   a gripping portion collects the evaporation ropes toward a center of the evaporation rope module.

6. The high efficiency seawater evaporation apparatus of claim 1, further comprising
   an overflow water pool which is connected to the saltpan, and
   a pump which pumps enriched water from the overflow water pool to an upper position of the evaporation rope module.

7. The high efficiency seawater evaporation apparatus of claim 6, further comprising
   a crystallizing pond for receiving the enriched water which flows down along the evaporation ropes in the saltpan and the concentration of salt becomes higher, and
   a salinometer for measuring the salinity of the enriched water concentrated in the saltpan, wherein the salinometer is between the saltpan and the crystallizing pond.

8. The high efficiency seawater evaporation apparatus of claim 1, wherein
   the showering unit includes a plurality of dispersion pipes arranged at an upper position of the evaporation rope module, and
   two or more nozzles extending in order to be adjacent to two or more evaporation rope modules are provided at each of the dispersion pipes.

9. The high efficiency seawater evaporation apparatus of claim 8, wherein each of the nozzles includes
   a jet propulsion sleeve part which becomes gradually smaller from a base end part to a front end part, and
   a jet hole in the front end of the jet propulsion sleeve part.

10. The high efficiency seawater evaporation apparatus of claim 8, further comprising a seawater pumping pipe, wherein
    the seawater pumping pipe is connected to the dispersion pipes,
    a drain guide portion is provided at the seawater pumping pipe, and
    a valve is provided at the drain guide portion.

11. The high efficiency seawater evaporation apparatus of claim 1, wherein a control part for spraying the seawater at regular intervals is connected to the showering unit.

12. High efficiency seawater evaporation apparatus comprising:
    a showering unit installed at a saltpan;
    and multiple evaporation ropes which extend in upper and lower directions of the showering unit,
    wherein the evaporation ropes are separated from each other by a predetermined interval,
    wherein the seawater flows down the multiple evaporation ropes and evaporates when the seawater is supplied by the showering unit,
    wherein the evaporation ropes are connected to a plurality of connection ropes,
    wherein each of the connection ropes includes a first direction slope rope part and a second direction slope rope part, and
    the first direction slope rope part and the second direction slope rope part of each of the connection ropes are arranged in a zigzag.

13. The high efficiency seawater evaporation apparatus of claim 12, wherein a net shape is formed by the evaporation ropes and the connection ropes.

14. An evaporation rope module for the seawater evaporation apparatus comprising:
    a plurality of the evaporation ropes installed in a saltpan, the evaporation ropes extending in upper and lower directions;
    a plurality of holders which collect multiple evaporation ropes in group;
    and wherein
       the evaporation ropes are separated from each other by a predetermined interval by the holders, and
       when seawater is supplied to a respective evaporation rope of the plurality of the evaporation ropes, the seawater flows down along the respective evaporation rope and evaporation of the seawater is induced.

15. The evaporation rope module for the seawater evaporation apparatus of claim 14, wherein a plurality of the evaporation ropes are provided in each of the holders, rope holes penetrate each of the holders, and respective evaporation ropes are in respective rope holes so that the respective evaporation ropes are separated from each other by a predetermined space.

* * * * *